May 10, 1927.  1,627,972
J. H. HEWITT ET AL
CHAIN MANUFACTURING MACHINERY
Filed Dec. 17, 1925   7 Sheets-Sheet 3

Patented May 10, 1927.

1,627,972

UNITED STATES PATENT OFFICE.

JOHN HERBERT HEWITT, OF BIRMINGHAM, AND BERNARD WULSTAN HARCOURT, OF SUTTON COLDFIELD, ENGLAND.

CHAIN-MANUFACTURING MACHINERY.

Application filed December 17, 1925. Serial No. 76,095.

This invention relates to an improved machine for manufacturing chains of the kind in which a series of links are secured side by side in staggered relationship by means of pivot members passing through perforations in the links. Such chains usually comprise alternately an odd number and an even number of links, say three links, then two links, then three links, but it is to be understood that any suitable number of links may be used and the alternate arrangements may be all even numbers.

The object of the present invention is to provide an improved machine for manufacturing such chains, and in order that our invention may be clearly carried into practice, the invention will be described with reference to the accompanying drawings, in which.

Figures 1, 14:
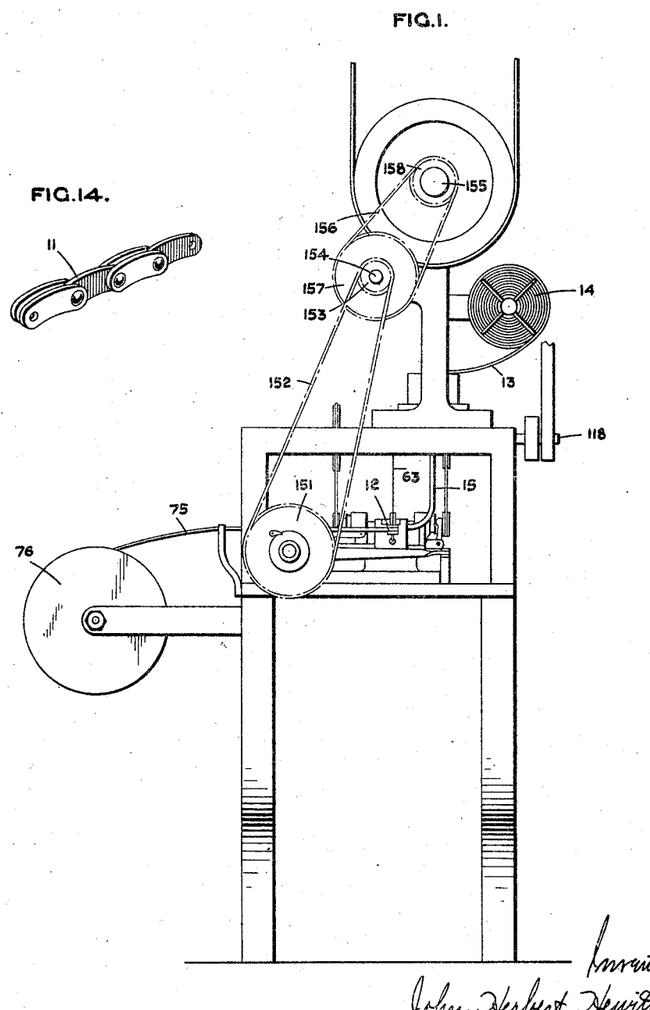
Figure 1 is a side view of the machine.
Figure 14 is a perspective view of a length of the chain formed by the particular machine illustrated.
Figure 2:
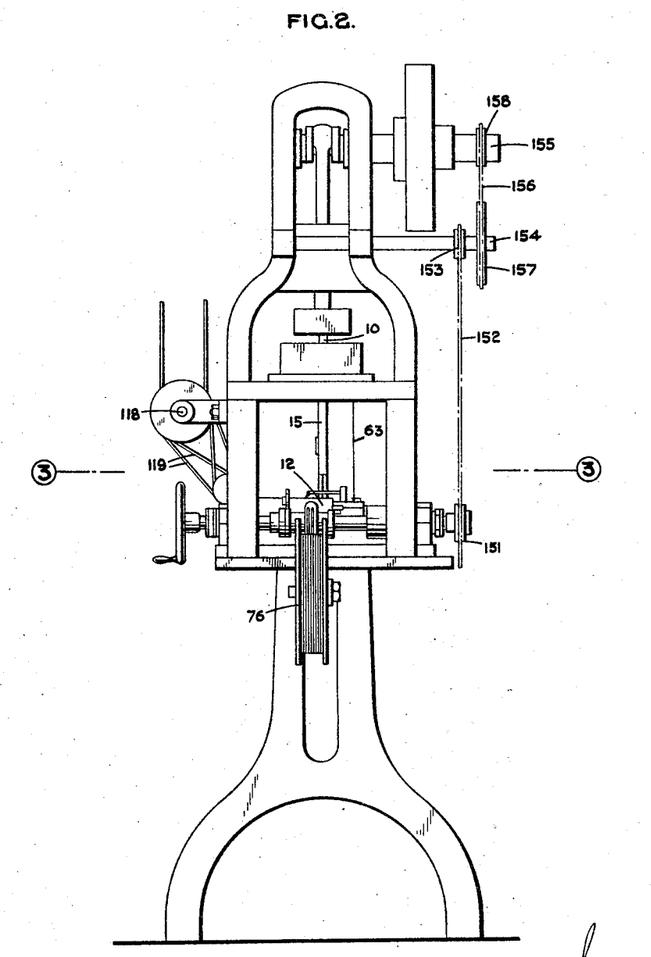
Figure 2 is a front view thereof.

Referring more particularly to Figures 1 and 2 of the drawings, the machine comprises a stamping mechanism 10 for forming the chain links 11 which is located above an assembling mechanism 12 and comprises a pair of follow on tools for piercing rivet holes or perforations in the links and cutting out the links from strip metal 13 which is drawn in from a roll 14. The blanks are ejected from the stamping unit 10 into a member 15 which forms a passage for supplying the assembling mechanism 12.

Figure 12:
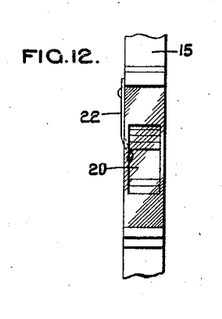
Figure 12 is a detailed section of the link supply passage.
Figure 13:
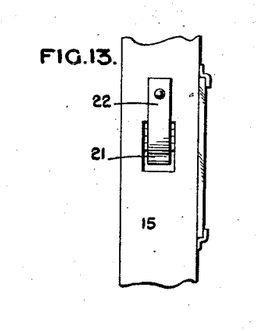
Figure 13 is a side view thereof.

In order that the links shall not turn over or alter their desired position in the supply passage 15 as they are ejected one by one from the stamping mechanism 10, a spring retaining device is provided as illustrated in Figures 12 and 13. This device comprises an opening 20 in the side of a vertical portion of the member 15 into which presses the curved end 21 of a plate spring 22 for the purpose of preventing the links from falling beyond the end of the spring 21 until they are positively forced past it one by one by the ejection of further links from the stamping mechanism 10. On falling past the spring 22 the links form a pile in the lower part of the member or passage 15, and thus it will be seen that a gap in the supply of links is formed in the vertical portion of the supply passage 15 which is positioned intermediately of its ends. This gap serves to allow for any slight differences in the thickness of the links and also to provide for the intermittent absorption of a group of links by the assembling mechanism while the stamping mechanism produces them one by one.

Figure 3:
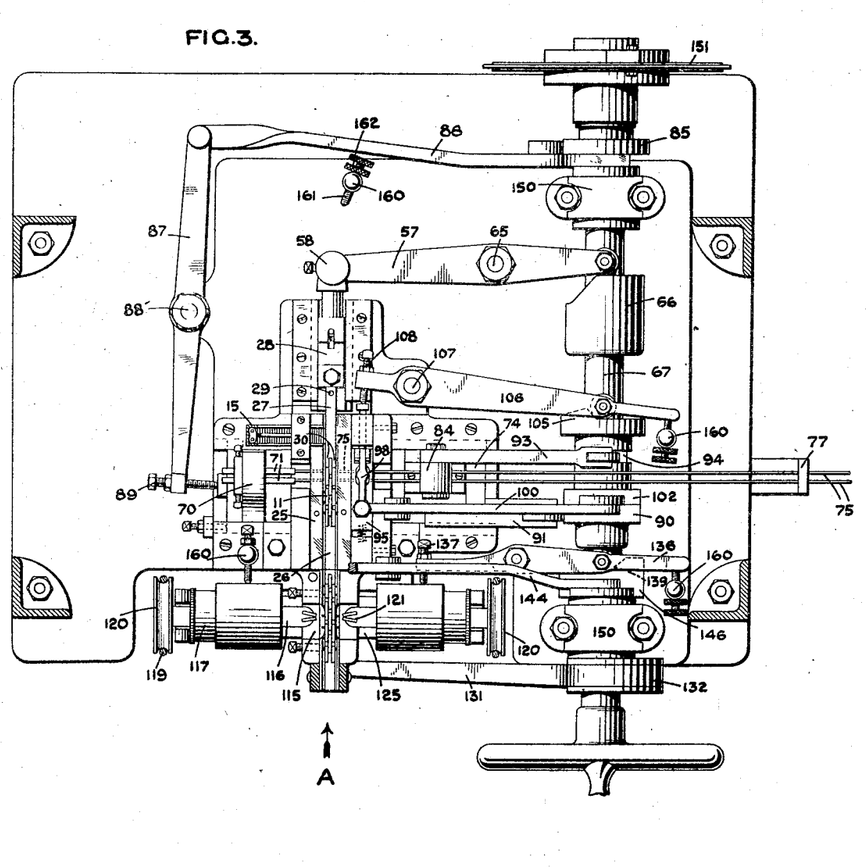
Figure 3 is a horizontal section on line 3—3 of Figure 2 with certain parts removed to show the mechanism more clearly.
Figure 6:
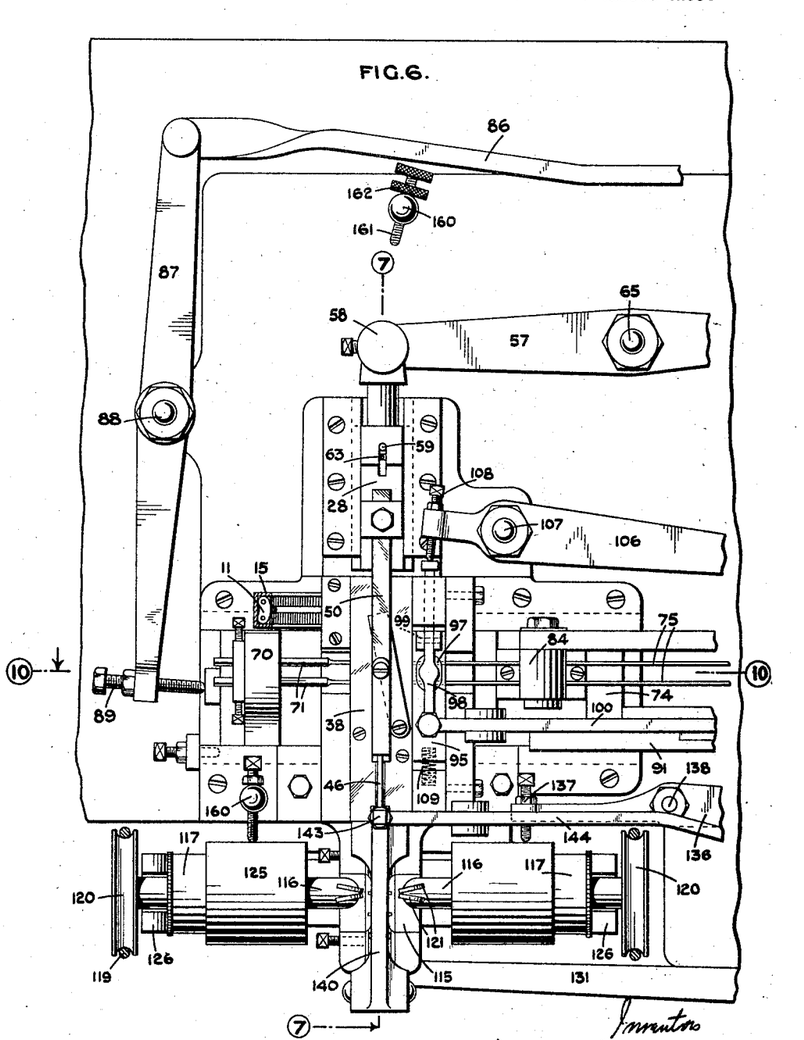
Figure 6 is an enlarged view showing a part of the mechanism illustrated in Figure 3 with all the parts in place.

Referring now more particularly to Figures 3 and 6, the assembling mechanism comprises essentially a bed 25 which is formed with a longitudinal groove 26 which extends in a direction at right angles to the delivery end of the passage 15 and is of a width adapted to receive a group of links side by side from the passage 15 sufficient to form one chain unit. A sliding plunger 27 is provided in the end of the passage 26 and is adapted to move forward the group of links as they are fed in from the passage 15. The plunger 27 is detachably mounted on a sliding block 28 by means of a pin and slot connection at 29 which enables it to be readily removed and replaced by another plunger in the event of damage or of a different movement or spacing of the links being required.

Figures 7, 8, 9:
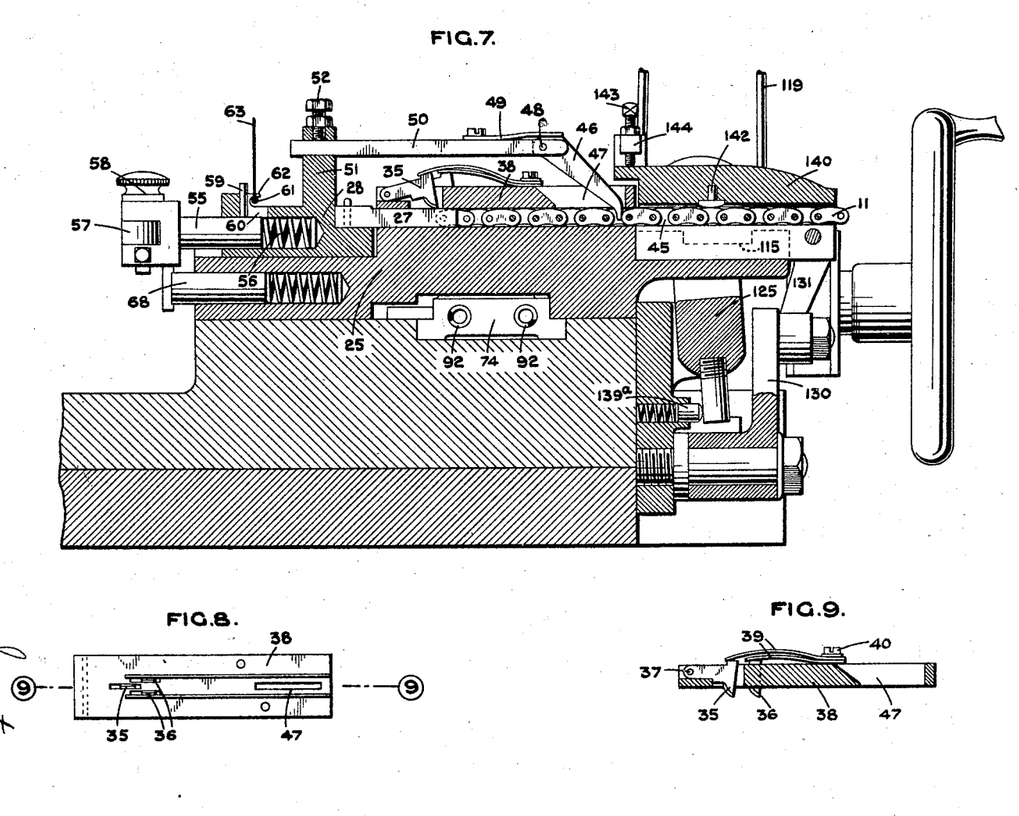
Figure 7 is a longitudinal section taken on line 7—7 of Figure 6.
Figure 8 is an inverted plan view of a part illustrated in Figure 7.
Figure 9 is a section on line 9—9 of Figure 8.
Figure 10:
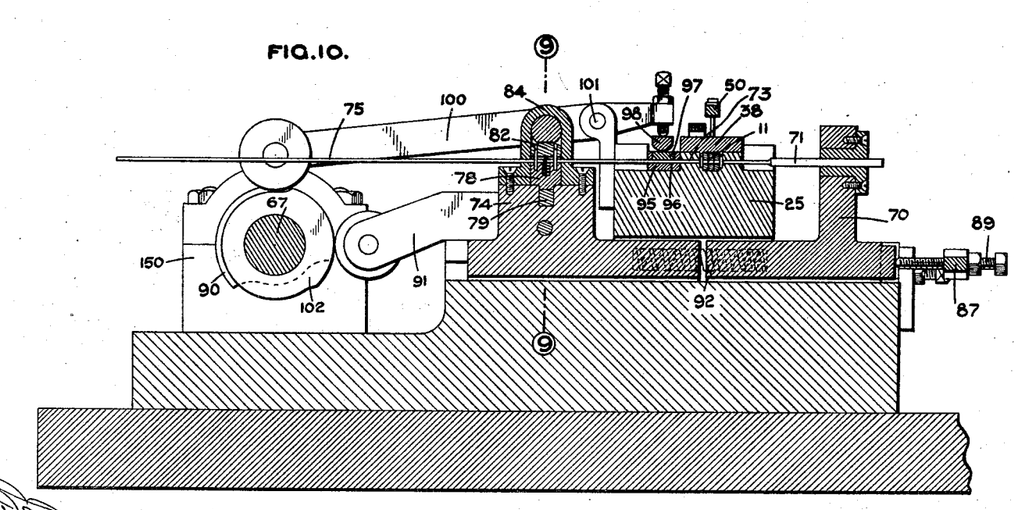
Figure 10 is a transverse section on line 10—10 of Figure 6.
Figure 11:
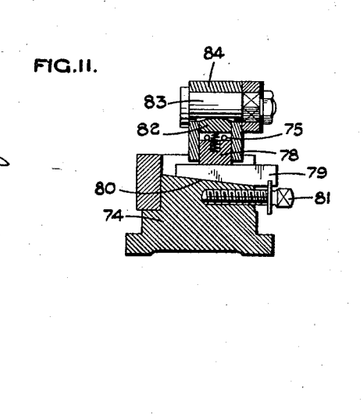
Figure 11 is a detailed section on line 11—11 of Figure 10.

In the machine illustrated the formation of each chain unit requires three links, as the chain formed by the machine illustrated, and as shown in Figure 14, comprises alternately a single link, then a pair of links, and then a single link. The end of the plunger 27 is formed with two forward projections 30 which are adapted to engage the outer of the two outer links of the group of three as they are fed from the passage 15, and to push them further forward than the centre link which becomes retarded into a position between the projections 30. In order to ensure the correct positioning of the links, the three curved spacing or positioning fingers are caused to project into the passage 26 by spring pressure. One of these fingers 35 is positioned more forwardly than the remaining two fingers 36 (see Figures 7, 8 and 9), and as the plunger 27 moves forward the group of three links, the finger 35 ensures that the central link will be retarded with respect to the outer two links, while the fingers 36 serve to correctly position the central link of the previous group so as to leave room for the forward ends of the two outer links of the following group. The fingers 35 and 36 are pivotally mounted at 37 in a block 38 which is removably secured in position on the bed 25. Two plate springs 39 secured to the block 38 by a single screw 40 serve to press the fingers 35 and 36 into the passage 26, but allow of their displacement when the links are pushed forward by the plunger 27.

After the links are pushed forward and positioned by the members 27, 35 and 36, they are connected one to the other to form a chain unit and also to the previously connected links in the passage 28 by means of rivets or pivot members in a manner hereinafter described. It will be seen from Figures 7 to 14 that spaces 45 occur between the ends of adjacent links, and for this reason it is necessary to provide additional means for moving forward the connected links or chain in the passage 28. This is effected by means of a pawl 46 which projects through a slot 47 in the member 38 and engages the spaces 45, the pawl being pivoted at 48 and engaged by a plate spring 49 on an arm 50. The arm 50 is mounted in a slotted extension 51 of the sliding block 28, and a gripping screw 52 is provided to enable the position of the arm 50 to be adjusted. Thus it will be seen that with each forward movement of the group of links by the sliding plunger 27, the connected links or chain are also moved forward by the pawl 46.

Within the sliding block 28 is provided a plunger 55 which is pressed or engaged by a spring 56 located in a recess in the block, and the end of the plunger 55 is provided with a connection to an operating lever 57 which is in the form of an eccentric or cam shaped pivot pin 58 which renders the connection adjustable. Normally the plunger 55 and the block 28 move as one unit, but should the links for any reason jam within the passage 26, the spring and plunger connection of the block with the operating lever 57 allows relative motion to take place between the two. The plunger 55 is provided with a lateral pin 59 which, when this relative motion takes place, slides within a slot 60 in the part 28 and serves to disconnect a transverse pin 61 from a lip 62 on the block 28. The pin 61 may be connected by any suitable link 63 with a safety clutch for disengaging the machine from the source of power, it being understood that this clutch normally tends to move into the disengaged position but is prevented from doing so by the engagement of the pin 61 with the lip 62.

The operating lever 57 is pivoted intermediately of its ends at 65 and has its other end in engagement with a cam 66 provided on a longitudinal shaft 67 which serves to operate the assembling mechanism of the machine. This cam effects the forward movement of the plunger 28, and its return movement is effected by means of a spring pressed plunger 68 provided in the bed 25.

On one side of the assembling passage 26 is provided a slide 70 which is mounted to move in a transverse direction and carries two adjustable aligning pins 71 which project through transverse openings in the side of the bed 25, and on the forward motion of the slide 70 enter the perforations in the group of links which have been moved into the forward position in the passage 26 by the plunger 27. The pins 71 serve to accurately align the perforations in the links with two holes in the other side of the bed, one of which holes is shown at 73 in Figure 10. On this other side of the bed is provided a second transverse slide 74. On the slide 74 is provided a device (see Figures 10 and 11) for gripping a pair of rivet forming wires 75 which pass into the machine from a roll 76 by way of a guide 77. The gripping device comprises an abutment 78 mounted on a sliding inclined bed 79 which engages an inclined face 80 on the slide 74 and can be given a fine adjustment by means of a screw 81. The wires 75 rest on the abutment 78 and are adapted to be gripped when required by a member 82 interposed between a cam shaped member 83 mounted in a U shaped bearing 84 secured to the slide 74.

The forward movement of the slide 70 is operated from a cam 85 on the shaft 67 by means of a slidably mounted member 86 connected at one end to an operating lever 87 pivotally mounted at 88 and provided with an adjustment screw 89 at its other end for bearing on the slide 70. The forward movement of the slide 74 is operated from a cam 90 on the shaft 67 by means of an extension 91 on the slide. The return movements of these slides 70 and 74 are effected through the medium of coil springs 92 which are positioned between the slides and beneath the bed 25. The gripping device on the slide is operated by an arm 93 which is keyed to the cam shaped member 83 and engages a cam 94. Interposed between the bed 25 and the slide 74 is a longitudinally sliding block 95 provided with holes 96 normally in alignment with the holes 73. The wires 75 pass through the holes 96 and are adapted to be gripped thereon when required by means of a loosely mounted section 97 of the block which is adapted to be pressed by a lever 98 pivoted at one end 99 and engaged at its other end by a lever 100 pivoted at 101 and co-operating with a cam 102.

The operation of the slides 70 and 74 and the gripping members is as follows:—

After the pins 71 have correctly aligned the position of the links within the assembly passage 26, the arm 93 is actuated so as to cause the wires 75 to be gripped with respect to the slide 74, and the slide 74 is moved forward to cause the ends of the wires to push rivets positioned in the holes 73 into the perforations in the links. Before the slide 74 retracts, the member 97 is caused to grip the wires, and the member 82 is released so that the slide 74 retracts without withdrawing the wires. The block 95 is then caused to move longitudinally so as to shear off the parts of the wires which have been moved into the holes 73 so as to form fresh rivets. The block 95 is given its forward movement by a cam 105 by means of a lever 106 pivoted at 107 and having an adjustment screw 108 for engaging the block. A spring 109 serves to return the block.

As the slide 74 moves forward or inward the slide 70 retracts, and as the slide 70 moves forward, the slide 74 retracts. Thus, the two slides move to a large extent as a single unit, the retractive or outward movement of the slide 74 being effected by the cam 85 through the medium of the springs 92 and the retractive or outward movement of the slide 70 being effected by the cam 90 through the medium of the springs 92. The springs 92 serve to permit of the strokes of the slides 70 and 74 to be adjusted independently, for example to permit of the slide 70 being given a somewhat longer stroke than the slide 74. The springs 92 also serve to take up any slack in the mechanism for operating the slides.

Figure 4:
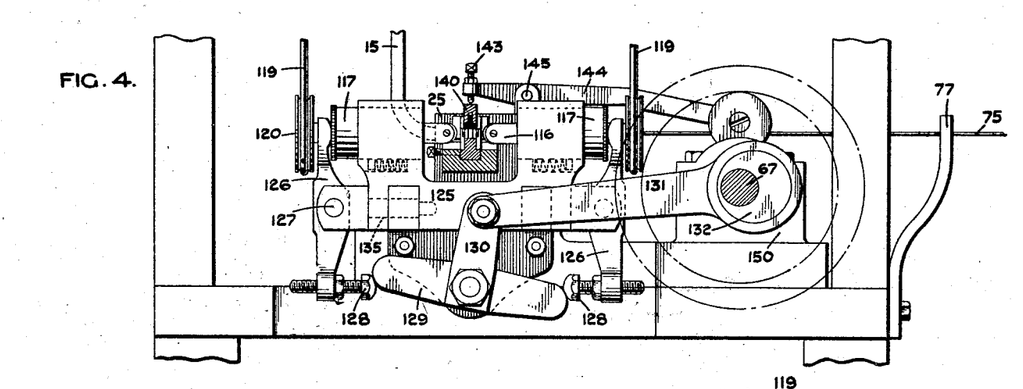
Figure 4 is a detailed end view partly in section and taken in the direction of the arrow A in Figure 3.
Figure 5:
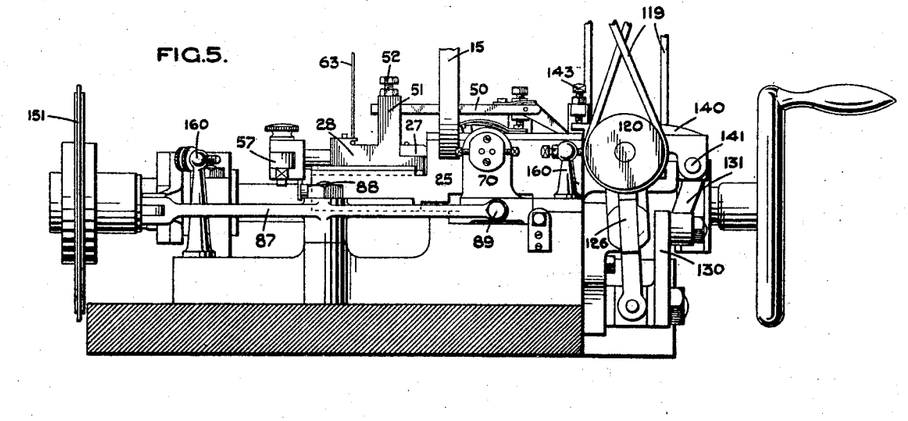
Figure 5 is a detailed view looking from the rear of the machine.

Near the end of the assembly passage 26, the bed 25 is formed with two lateral openings 115 into which project the ends of two spindles 116 which are mounted on either side of the passage 26 in sleeve like members 117 which carry ball bearings. The spindles 116 are continuously rotated at high speed in opposite directions from a shaft 118 by driving cords 119 which pass around pulleys 120 at the ends of said spindles, one of the driving cords 119 being crossed. The inner ends of the spindles 116 each carry two hardened steel wheels 121 which are set at an angle to each other, and when brought into engagement with the ends of the rivets in the chain, are adapted to spin over their ends so as to form enlarged heads. In order to allow of the inward movement of the spindles 116, the sleeve like bearing members 117 are slidably mounted within the two arms of a U shaped spinner block 125. The bearing members 117 are engaged by forked levers 126 (see Figure 4) which are pivoted at 127 to the spinner block and carry at their ends adjustable operating faces 128 which face inwardly one towards the other. Between these faces 128 is a centrally pivoted rocker arm 129 provided with rounded ends which are adapted to engage the faces 128 on its being oscillated so as to bring the spinners 121 into or out of engagement with the ends of the rivets. The rocker arm 129 is provided with a crank arm 130 which is connected at its end to an arm 131 which is reciprocated by means of an eccentric 132 on the shaft 67. The spinner block 125 is mounted on a horizontal spindle 135 which enables it to be oscillated so as to bring the spinners 121 into engagement first with the one rivet of each chain unit, and then with the second rivet of that chain unit. The spinner block is moved in one direction of its oscillating movement by means of a lever 136 having an adjustable operating head 137 at one end and a pivot intermediately of its ends at 138, the other end of the lever being operated by means of a cam 139. A spring pressed plunger 139$^a$ is provided on the body of the machine for effecting the return movement of the spinner block. It is to be understood that for each rotation of the shaft 67, the spinner block is once oscillated, whilst the spinners 121 are twice moved inwardly and outwardly.

Over the end of the assembly passage 26 is a cover member 140 which is pivoted at one end at 141 and is formed with a recess for containing a small plunger 142 which normally bears lightly on the top of the chain. When the spinners 121 move inwardly to engage the ends of the rivets, the member 140 is depressed by an adjustable bearing member 143 provided on the end of a lever 144 which is pivoted at 145 and engaged at its other end by a cam 146, thereby ensuring that the chain will be held firmly during the spinning operation.

After passing the spinners, the chain then issues from the end of the assembly passage 26 in its finished form.

The cam shaft 67 is mounted in bearings 150 and is provided with a chain wheel 151 at one end which is driven by a chain 152 from a chain wheel 153 on a countershaft 154, which countershaft is driven from the driven shaft 155 of the stamping mechanism by means of a chain 156 and chain wheels 157 and 158. The chain wheels 158 and 151 are provided with a free wheel mounting which enables the stamping mechanism and the assembly mechanism to be separately turned round by hand when desired.

In order to limit the backward movement of the various spring returned members of the assembly mechanism, adjustable stops are provided comprising a fixed support 160 through which passes a screw 161 forming the stop proper and a lock nut 162. In the drawings, these are shown for limiting the backward movement of the plunger 27, the lever 106 which operates the shearing slide 95, and the lever 136 which operates the spinner block 125. In addition to these, a further stop is illustrated on the left hand side of Figure 3 for directly bearing on the spinner block 125.

Although the invention has been described as applied to a machine for making chains having alternately two links and then one link, it will be readily appreciated that the machine can be easily adapted for making different forms of chains having a variety of arrangements and numbers of links for composing each unit. Also the spaces between the ends of adjacent links can be easily varied, and if desired, these spaces can be dispensed with entirely, and in this case the pawl 46 and its adjustable mounting can be dispensed with as the forward movement of the plunger can then be made to move forward the whole of the chain within the assembly passage 26.

What I claim then is:—

1. In a machine for manufacturing chains, the combination of a feed device for supplying links; a bed having an assembly passage for receiving said links; means for relatively positioning the links within the assembly passage to form chain units; said means including a sliding plunger adapted to relatively position and move forward said links; means for connecting said chain units by inserting pivot members in perforations in the links; and a feed device for engaging the connected units and moving them forward to accommodate the links which are being moved forward by the plunger; whereby the machine is enabled to assemble chains in which the ends of adjacent links of the same course are spaced apart.

2. In a machine for manufacturing chains, the combination of a feed device for supplying links; a bed having an assembly passage for receiving said links; means for relatively positioning the links within the assembly passage to form chain units, said means including a reciprocating plunger adapted to relatively position and move forward said links; means for connecting said chain units by inserting pivot members in perforations in the links; and a feed device mounted to reciprocate with the sliding plunger and adapted to engage the connected units and move them forward to accommodate the links which are being moved forward by the plunger; whereby the machine is enabled to assemble chains in which the ends of adjacent links of the same course are spaced apart.

3. In a machine for manufacturing chains, the combination of a member forming a link supply passage; a bed having an assembly passage which receives links from the supply passage, the delivery end of the supply passage extending laterally in relation to the assembly passage; means for relatively positioning the links within the assembly passage to form chain units, said positioning means including a sliding plunger adapted to operate within the assembly passage; means for connecting the positioned links by means of pivot members engaging perforations in the links; and a pawl coupled to move with the sliding plunger and adapted to enter a space between connected links in order to move forward the assembled chain; whereby the machine is enabled to assemble chain in which the ends of adjacent links of the same course are spaced apart; all for the purpose specified.

4. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; and an adjustable mounting on the sliding block carrying a spring pressed pawl adapted for engaging a space between connected links in order to move forward the chain; whereby the machine is enabled to assemble chain in which the ends of adjacent links of the same course are spaced apart; all for the purpose specified.

5. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; an adjustable mounting on the sliding block carrying a spring pressed pawl adapted for engaging a space between connected links in order to move forward the chain; and a spring pressed plunger on the block having an adjustable connection with an operating member, said spring pressed plunger being adapted normally to transmit motion to the sliding block but on the occurrence of exceptional resistance being adapted to move with respect to the block and actuate a control device, all for the purpose specified.

6. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; an adjustable mounting on the sliding block carrying a spring pressed pawl adapted for engaging a space between connected links in order to move forward the chain; and means for advancing the assembled chain comprising a plunger normally extended by a spring which is adapted to be compressed in the event of the machine or chain becoming deranged; all for the purpose specified.

7. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; an adjustable mounting on the sliding block carrying a spring pressed pawl adapted for engaging a space between connected links in order to move forward the chain; a clutch controlling device; means for advancing the assembled chain; and means for automatically operating said clutch controlling device to stop the machine in the event of the machine or chain becoming deranged; all for the purpose specified.

8. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units; transverse holes in the bed in substantial alignment with the perforations in the links when said links are positioned within the assembly passage to form a chain unit; a transverse slide carrying on one side of the assembly passage alignment pins adapted accurately to align said perforations in the links with said holes in the bed; a second transverse slide on the other side of the assembly passage adapted to follow substantially the movement of said first mentioned slide and to push pivot members from said transverse holes into the link perforations; independent operating means for moving each of said two transverse slides inwardly; a resilient member interposed between said two transverse slides and serving as a medium for moving the slides outwardly and for permitting relative movement between them; and means for moving forward the connected links; all for the purpose specified.

9. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units; transverse holes in the bed in substantial alignment with the perforations in the links when said links are positioned within the assembly passage to form a chain unit; a transverse slide carrying on one side of the assembly passage alignment pins adapted accurately to align said perforations in the links with said holes in the bed; a second transverse slide on the other side of the assembly passage adapted to follow substantially the movement of said first mentioned slide and to push pivot members from said transverse holes into the link perforations; means for independently operating said transverse slides; and means for moving forward the connected links; all for the purpose specified.

10. In a machine for manufacturing chains, the combination of means for assembling the chain links; means for inserting rivets in said assembled links; means for advancing said assembled links; a spinner block having slidably mounted bearings carrying a spindle on either side of said assembled links; means for rotating the spindles; spinning devices at the inner ends of the spindles; spring means tending to slide the bearings outwardly; a lever engaging each bearing and operable to slide same inwardly to cause the spinning devices to engage with the ends of the pivot members; a centrally pivoted rocker arm having its ends adapted to slide across adjustable bearing faces provided on the levers; and means for oscillating the rocker arm; all for the purpose specified.

11. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; transverse holes in the bed in substantial alignment with the perforations in the links when said links are positioned within the assembly passage to form a chain unit; a transverse slide carrying on one side of the assembly passage alignment pins adapted accurately to align said perforations in the links with said holes in the bed; positive operating means for moving said slide towards the links and spring operating means for returning same; a second transverse slide on the other side of the assembly passage adapted to follow the movement of said first mentioned slide and to push pivot members from said transverse holes into the link perforations; positive operating means for moving said second transverse slide towards the links and spring operated means for returning same; and an adjustable mounting on the sliding block carrying a spring pressed pawl adapted for engaging a space between connected links in order to move forward the chain; all for the purpose specified.

12. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; an adjustable mounting on the sliding block carrying a spring pressed pawl adapted for engaging a space between connected links in order to move forward the chain; openings in either side of the bed for exposing the connected links; a pivotally mounted spinner block having slidably mounted bearings carrying a spindle on either side of said connected links; means for rotating the spindles, spinning devices at the inner ends of the spindles; spring means tending to slide the bearings outwardly; a lever engaging each bearing and operable to slide same inwardly to cause the spinning devices to engage with the ends of the pivot members; a centrally pivoted rocker arm having its ends adapted to slide across adjustable bearing faces provided on the levers; means for oscillating the rocker arm; and means for oscillating the spinner block to bring the spindles successively in alignment with the two pivot members of each chain unit, whereby the spinning devices are caused to spin over the ends of a pair of pivot members without altering the position of the connected links; all for the purpose specified.

13. In a machine for manufacturing chains, the combination of a member forming a link supply passage; a bed having an assembly passage which receives links from the supply passage, the delivery end of the supply passage extending laterally in relation to the assembly passage; means for relatively positioning the links within the assembly passage to form chain units, said positioning means including a sliding plunger adapted to operate within the assembly passage; means for connecting the positioned links by means of pivot members engaging perforations in the links; means for moving forward the connected links; transverse holes in the bed in substantial alignment with the perforations in the links when said links are positioned within the assembly passage to form a chain unit; a transverse slide carrying on one side of the assembly passage alignment pins adapted accurately to align said perforations in the links with said holes in the bed; positive operating means for moving said slide towards the links and spring operating means for returning same; a second transverse slide on the other side of the assembly passage adapted to follow the movement of said first mentioned slide and to push pivot members from said transverse holes into the link perforations; positive operating means for moving said second transverse slide towards the links and spring operated means for returning same; openings in either side of the bed for exposing the connected links; a pivotally mounted spinner block having slidably mounted bearings carrying a spindle on either side of said connected links; means for rotating the spindles; spinning devices at the inner ends of the spindles; spring means tending to slide the bearings outwardly; a lever engaging each bearing and operable to slide same inwardly to cause the spinning devices to engage with the ends of the pivot members; a centrally pivoted rocker arm having its ends adapted to slide across adjustable bearing faces provided on the levers; means for oscillating the rocker arm; and means for oscillating the spinner block to bring the spindles successively in alignment with the two pivot members of each chain unit, whereby the spinning devices are caused to spin over the ends of a pair of pivot members without altering the position of the connected links; all for the purpose specified.

14. In a machine for manufacturing chains, the combination of a member forming a link supply passage having its delivery end arranged in a transverse direction; a bed having an assembly passage which receives links from the supply passage and is arranged in a longitudinal direction; means for relatively positioning the links within the assembly passage to form chain units, said means including a sliding block carrying a detachably mounted sliding plunger adapted to operate within the assembly passage; transverse holes in the bed in substantial alignment with the perforations in the links when said links are positioned within the assembly passage to form a chain unit; a tranverse slide carrying on one side of the assembly passage alignment pins adapted accurately to align said perforations in the links with said holes in the bed; positive operating means for moving said slide towards the links and spring operating means for returning same; a second transverse slide on the other side of the assembly passage adapted to follow the movement of said first mentioned slide and to push pivot members from said transverse holes into the link perforations; positive operating means for moving said second transverse slide towards the links and spring operated means for returning same; an adjustable mounting on the sliding block carrying a spring pressed pawl adapted for engaging a space between connected links in order to move forward the chain; a spring pressed plunger on the block having an adjustable connection with an operating member, said spring pressed plunger being adapted normally to transmit motion to the sliding block but on the occurrence of exceptional resistance being adapted to move with respect to the block and actuate a control device; openings in either side of the bed for exposing the connected links; a pivotally mounted spinner block having slidably mounted bearings carrying a spindle on either side of said connected links; means for rotating the spindles; spinning devices at the inner ends of the spindles; spring means tending to slide the bearings outwardly; a lever engaging each bearing and operable to slide same inwardly to cause the spinning devices to engage with the ends of the pivot members; a centrally pivoted rocker arm having its ends adapted to slide across adjustable bearing faces provided on the levers; means for oscillating the rocker arm; and means for oscillating the spinner block to bring the spindles successively in alignment with the two pivot members of each chain unit, whereby the spinning devices are caused to spin over the ends of a pair of pivot members without altering the position of the connected links; all for the purpose specified.

In witness whereof we affix our signatures.

JOHN HERBERT HEWITT.
BERNARD WULSTAN HARCOURT.